(12) United States Patent
Ryu (10) Patent No.: US 11,119,554 B2
(45) Date of Patent: Sep. 14, 2021

(54) POWER MANAGEMENT INTEGRATED CIRCUIT MODELING SYSTEM AND METHOD OF DRIVING THE SAME

(71) Applicant: SAMSUNG ELECTRONICS CO., LTD., Suwon-si (KR)

(72) Inventor: Soon Keol Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 16/380,323

(22) Filed: Apr. 10, 2019

(65) Prior Publication Data

US 2020/0183472 A1 Jun. 11, 2020

(30) Foreign Application Priority Data

Dec. 11, 2018 (KR) .................. 10-2018-0159228

(51) Int. Cl.
*G06F 1/28* (2006.01)
*G06F 30/18* (2020.01)
*G01R 19/25* (2006.01)
*G06F 30/36* (2020.01)

(52) U.S. Cl.
CPC ........... *G06F 1/28* (2013.01); *G01R 19/2513* (2013.01); *G06F 30/18* (2020.01)

(58) Field of Classification Search
CPC ........ G06F 1/28; G06F 30/18; G01R 19/2513
See application file for complete search history.

(56) References Cited

U.S. PATENT DOCUMENTS

| 7,834,651 | B2 | 11/2010 | Obara |
| 8,381,151 | B1 | 2/2013 | Rochel et al. |
| 8,933,716 | B2 | 1/2015 | Ishida et al. |
| 9,112,350 | B2 | 8/2015 | Davis et al. |
| 2009/0179652 | A1 | 7/2009 | Obara |
| 2011/0095803 | A1* | 4/2011 | Meijer .................. G06F 1/3243 327/291 |
| 2011/0181308 | A1 | 7/2011 | Ishida et al. |
| 2011/0194217 | A1 | 8/2011 | Davis et al. |
| 2012/0146416 | A1 | 6/2012 | Ishida et al. |
| 2012/0212206 | A1* | 8/2012 | Chevrier ................... G05F 1/67 323/298 |
| 2013/0096859 | A1* | 4/2013 | Luo .......................... G06F 1/26 702/65 |

(Continued)

*Primary Examiner* — Jaweed A Abbaszadeh
*Assistant Examiner* — Gayathri Sampath
(74) *Attorney, Agent, or Firm* — Sughrue Mion, PLLC (57) ABSTRACT

A power management integrated circuit (PMIC) modeling system for a power distribution network (PDN) analysis, includes a power supply configured to supply a source current for driving a load, a resistance setting unit configured to monitor a load current being supplied to the load, and generate a current comparison value by comparing a first current value of the load current at a current time with a second current value of the load current at a previous time, and a controller configured to, based on the current comparison value generate a control signal for changing a variable resistance of the resistance setting unit, and control the power supply to change the source current. The resistance setting unit is further configured to, based on the control signal, change a resistance value of the variable resistance.

20 Claims, 10 Drawing Sheets

(56) References Cited

U.S. PATENT DOCUMENTS

| | | | |
|---|---|---|---|
| 2015/0130439 A1* | 5/2015 | Wang | H03H 7/40 |
| | | | 323/299 |
| 2016/0109868 A1* | 4/2016 | Harrant | H02J 7/007 |
| | | | 700/295 |
| 2016/0124478 A1 | 5/2016 | Beeston et al. | |
| 2017/0277251 A1* | 9/2017 | Gong | G06F 1/266 |

* cited by examiner

```
// VerilogA for PMIC, veriloga
`define cross_accuracy 1.0p
`include "constants.vams"
`include "disciplines.vams"

module PMIC( VOUT, GND);
inout VOUT;
electrical VOUT;
inout GND;
electrical GND;
parameter real vdd= 0.75; // pmic output voltage
parameter real imax = 10; // Current limit (A)
parameter real didtmax = 1/1E-6; // di/dt limit (A/s)

//pragma protect begin_protected
//pragma protect key_keyowner=Cadence Design Systems.
//pragma protect key_keyname=CDS_KEY
//pragma protect key_method=RC5
//pragma protect key_block
ohn/35YyoLBePMxeHopUbkENkTNtb3ef)AQSycSmpnYiR6tgtHsLhkkuQOEDRpIF
n58ck8hDe+hj2j4uSyQnYqSBYj/Y7vXCCaP/3oBq/vp4HS1MMMXJKhvjBnIQpXGc
Zf5EOANBdwJyABoGoPot3POU6QrY/K40YbIsQs8GGQ52Z22IyYL00Q==
//pragma protect end_key_block
//pragma protect digest_block
oXeqs5bkPgkucb7HDCwJKu8m6hA=
//pragma protect end_digest_block
//pragma protect data_block
"PMIC_MODEL_wport.vap" 74L, 3534C
```

POWER MANAGEMENT INTEGRATED CIRCUIT MODELING SYSTEM AND METHOD OF DRIVING THE SAME

CROSS-REFERENCE TO RELATED APPLICATION

This application claims priority from Korean Patent Application No. 10-2018-0159228, filed on Dec. 11, 2018, in the Korean Intellectual Property Office (KIPO), the disclosure of which is incorporated herein by reference in its entirety.

BACKGROUND

Systems and methods consistent with embodiments relate to a power management integrated circuit (PMIC) modeling system for a power distribution network (PDN) analysis and a method of driving the same.

Simulation models of a power management integrated circuit (PMIC) for verification of a power distribution network (PDN) apply an ideal voltage source and thus cannot reflect the capability of limiting current supply, which is the basic characteristic of the PMIC. In applying simulation models to the PDN, the influence of a voltage drop and a decoupling capacitor cannot be accurately reflected. There is a difference between the simulation result of the PMIC and PDN obtained using the simulation models and the actual measurement result.

SUMMARY

According to embodiments, there is provided a power management integrated circuit (PMIC) modeling system for a power distribution network (PDN) analysis, the PMIC modeling system including a power supply configured to supply a source current for driving a load, a resistance setting unit configured to monitor a load current being supplied to the load, and generate a current comparison value by comparing a first current value of the load current at a current time with a second current value of the load current at a previous time, and a controller configured to, based on the current comparison value generate a control signal for changing a variable resistance of the resistance setting unit, and control the power supply to change the source current. The resistance setting unit is further configured to, based on the control signal, change a resistance value of the variable resistance, and the load current is changed based on the source current and the resistance value that are changed.

According to embodiments, there is provided a power management integrated circuit (PMIC) modeling system for a power distribution network (PDN) analysis, the PMIC modeling system including a power supply configured to supply a source current for driving a load, a resistance setting unit configured to monitor a load current being supplied to the load, and generate a current comparison value by comparing a first current value of the load current at a current time with a second current value of the load current at a previous time, and a controller configured to, based on the current comparison value set parameters for controlling the source current of the power supply, and generate a control signal for changing a variable resistance of the resistance setting unit, based on the parameters. The resistance setting unit is further configured to, based on the control signal, change a resistance value of the variable resistance, and the load current is changed based on the source current and the resistance value that are changed.

According to embodiments, there is provided a method of operating a power management integrated circuit (PMIC) modeling system for a power distribution network (PDN) analysis, the method including controlling a power supply to supply a source current for driving a load, monitoring a load current being supplied to the load, generating a current comparison value by comparing a first current value of the load current at a current time with a second current value of the load current at a previous time, and based on the current comparison value, changing a resistance value of a variable resistance, and controlling the power supply to change the source current. The load current is changed based on the source current and the resistance value that are changed.

DETAILED DESCRIPTION OF THE EMBODIMENTS

Hereinafter, a power management integrated circuit (PMIC) modeling system and a method of driving the same according to embodiments of the inventive concept will be described in detail with reference to the accompanying drawings.

Verification of a power distribution network (PDN) is performed to ensure power and signal integrity (PSI) at the system level. A typical verification method used for product analysis may include configuring a PDN as a model for an on-chip die, a package, a board, and a PMIC, and verifying the PDN through simulation. An accurate PMIC model is used to verify characteristics similar to measurement results in an actual device through simulation. The inventive concept is directed to providing a PMIC modeling system reflecting a circuit operation characteristic of the PMIC and a method of driving the same.

The embodiments of the inventive concept are directed to providing a PMIC modeling system capable of limiting current supply of a PMIC and a method of driving the same.

In addition, the embodiments of the inventive concept are directed to providing a PMIC modeling system capable of predicting an influence of a voltage drop and a decoupling capacitor of a PDN and a method of driving the same.

Further, the embodiments of the inventive concept are directed to providing a PMIC modeling system capable of reducing a difference between a simulation result and an actual measurement result of a PMIC and a PDN and a method of driving the same.

Figure 1:
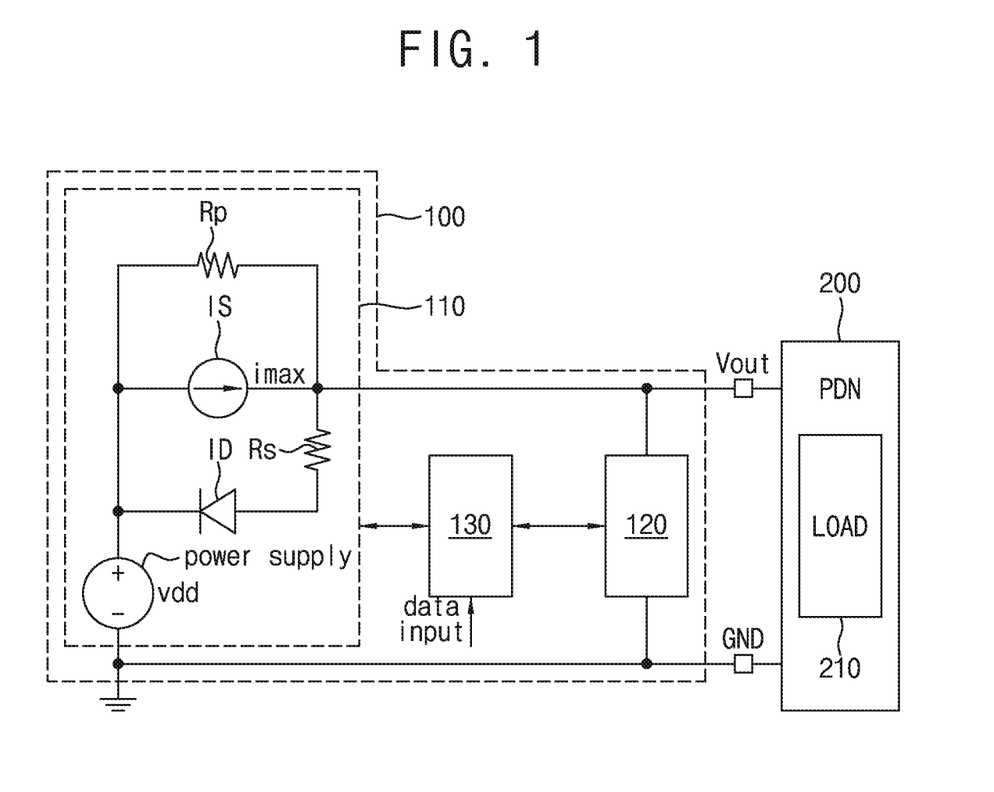
FIG. 1 is a diagram illustrating a PMIC modeling system according to embodiments of the inventive concept.

FIG. 1 is a diagram illustrating a PMIC modeling system according to embodiments of the inventive concept.

Referring to FIG. 1, a PMIC modeling system 100 includes a power supply 110, a resistance setting unit 120, and a controller 130. The power supply 110 may limit an output current according to a normal mode or a maximum current mode (imax mode).

The power supply 110 includes a current supply unit IS, an ideal diode ID, a first resistor Rp connected with the current supply IS in parallel, and a second resistor Rs connected with the ideal diode ID in series. The ideal diode ID may be replaced by a switch.

The PMIC modeling system 100 may supply power to a load 210 over a PDN 200. The PDN 200 may include the load 210. The load 210 is a component that performs a function by consuming power and may include a transistor, a wire, and/or a passive element.

As an example, the load 210 may include a microprocessor, a central processing unit (CPU), a graphics processing unit (GUP), an application processor, or a semiconductor memory device (e.g., a dynamic random access memory (DRAM), a phase change random access memory (PRAM), a magnetic random access memory (MRAM), a ferroelectric random access memory (FRAM), or a solid state drive (SSD)). The load 210 may be supplied with power through one or more power terminals. The load 210 may be supplied with an operation current i and an operation voltage v from the PDN 200.

The operation voltage v transmitted to the load 210 may be a direct current voltage. The operation voltage v may vary as the amount of the operation current i consumed due to operation of the load 210 varies. The range of variation of the operation voltage v that causes the load 210 to operate normally may include a tolerance of the supplied voltage.

The PMIC modeling system 100 may be driven in a maximum current mode or a normal mode according to a forward bias (or an ON operation of the switch) or a reverse bias (or an OFF operation of the switch).

In the maximum current mode, the PMIC modeling system 100 may supply a preset constant current (e.g., a maximum current) to the load 210 of the PDN 200.

In the normal mode, the PMIC modeling system 100 may supply a current requested by the load 210 to the load 210 without limiting a current required by the load 210.

As an example, the PMIC modeling system 100 may operate in the normal mode when the ideal diode ID is in the forward bias. In the normal mode, the PMIC modeling system 100 may perform an operation similar to that of an ideal voltage source.

As an example, the PMIC modeling system 100 may operate in the maximum current mode (imax mode) when the ideal diode ID is in the reverse bias. In the maximum current mode (imax mode), the PMIC modeling system 100 may operate as a direct current (DC) current source.

In performing the PDN simulation, the PMIC modeling system 100 may repeat switching between the normal mode and the maximum current mode (imax mode) several times. That is, the PMIC modeling system 100 may switch from the normal mode to the maximum current mode (imax mode) and also switch from the maximum current mode (imax mode) to the normal mode. Such switching between the drive modes may be repeated several times.

The PMIC modeling system 100 may adjust the supplied current such that the current supply capability of the power supply 110 does not exceed a current change with respect to the maximum time change, di/dt.

The PMIC modeling system 100 may supply the load 210 with a current within a preset maximum current.

When operating in the maximum current mode, the PMIC modeling system 100 may supply the load 210 with a current within the maximum current even in a case in which a current exceeding the maximum current is required by the load 210. When operating in the normal mode, the PMIC modeling system 100 may supply a current as required by the load 210.

The resistance setting unit 120 may monitor a load current being supplied to the load 210 in real time. The resistance setting unit 120 may compare the value of the load current monitored at the current time with a previously monitored value of the load current. The resistance setting unit 120 may transmit a result of comparison between the load current value at the current time and the load current value at the previous time to the controller 130 in real time.

The controller 130 may transmit the result of comparison between the load current value at the current time and the load current value at the previous time to the power supply 110 in real time.

The controller 130 may control an output current of the power supply 110 based on the current comparison result (i.e., a current comparison value) monitored by the resistance setting unit 120.

The controller 130 may load current waveform data of a current flowing into the chip (i.e., a current required by the chip) and may drive the loaded current waveform data and apply the same to the PDN verification. The controller 130 may include a memory configured to store current waveform data of individual chips and a processor configured to drive the current waveform data.

The power supply 110 may limit the current supply capability based on the current comparison result (i.e., the current comparison value) input from the controller 130. That is, the power supply 110 may limit the current being supplied to the load 210 based on the current comparison result (i.e., the current comparison value) input from the controller 130.

Figure 3A:
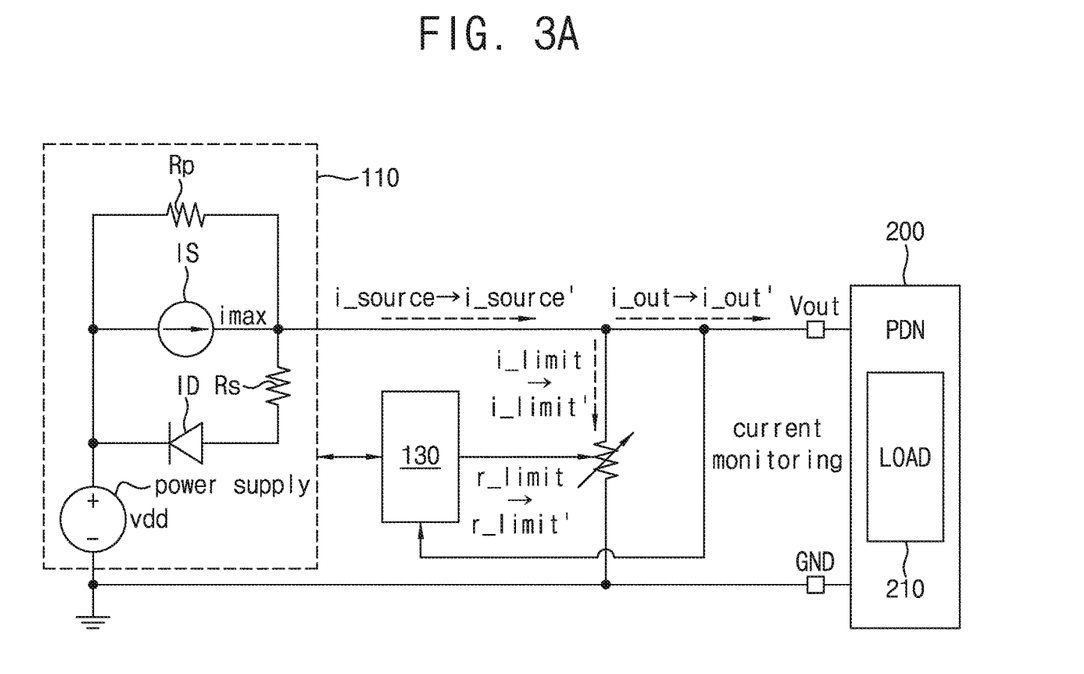
FIG. 3A is a diagram illustrating a method of driving a PMIC modeling system in a normal mode, according to embodiments of the inventive concept.

The resistance setting unit 120 may include a variable resistance (see FIG. 3A). The controller 130 may control the variable resistance of the resistance setting unit 120 based on the current comparison result (i.e., the current comparison value) monitored by the resistance setting unit 120. The controller 130 may generate a variable resistance control signal for controlling the variable resistance of the resistance setting unit 120 and supply the generated variable resistance control signal to the resistance setting unit 120.

The resistance setting unit 120 may change the variable resistance based on the variable resistance control signal input from the controller 130.

The controller 130 may calculate a maximum current allowable in the maximum current mode and adjust the variable resistance of the resistance setting unit 120 according to the calculated maximum current.

As an example, when operating in the normal mode, the resistance setting unit 120 may set the variable resistance to a maximum value (e.g., infinity) under control of the controller 130.

As an example, when operating in the maximum current mode (imax mode), the resistance setting unit 120 may adjust the variable resistance to a preset value under control of the controller 130 to limit the output current (i.e., the current being supplied to the load 210).

As an example, when operating in the maximum current mode (imax mode), the resistance setting unit 120 may adjust the output current in real time by changing the variable resistance according to the result of comparison of the current values monitored in real time.

As an example, when operating in the maximum current mode (imax mode), the resistance setting unit 120 may adjust the output current at time intervals by changing the variable resistance according to the result of comparison of the current values monitored at time intervals.

Figure 9:
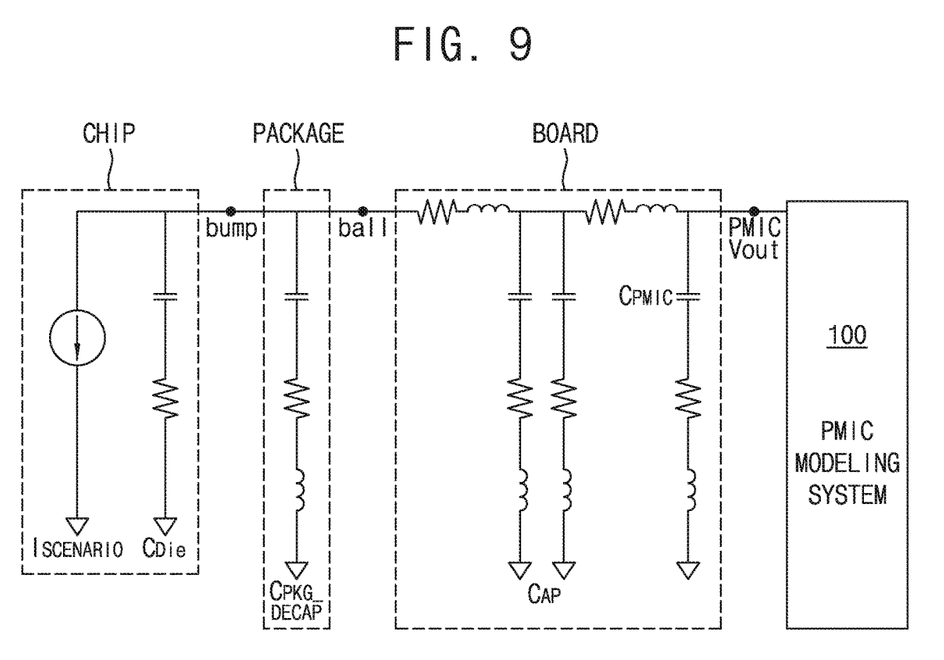
FIG. 9 is a diagram illustrating an example of verification of operation performance of a PMIC in which a PMIC modeling system according to embodiments of the inventive concept is applied to a chip package system unit.

The PDN 200 may be a chip-package system (see FIG. 9). The load 210 may be a chip included in the chip-package system. However, the embodiments are not limited thereto. The PDN 200 may be a mobile device (see FIG. 10). The load 210 may be an application processor (AP) included in the mobile device.

Figure 2A:
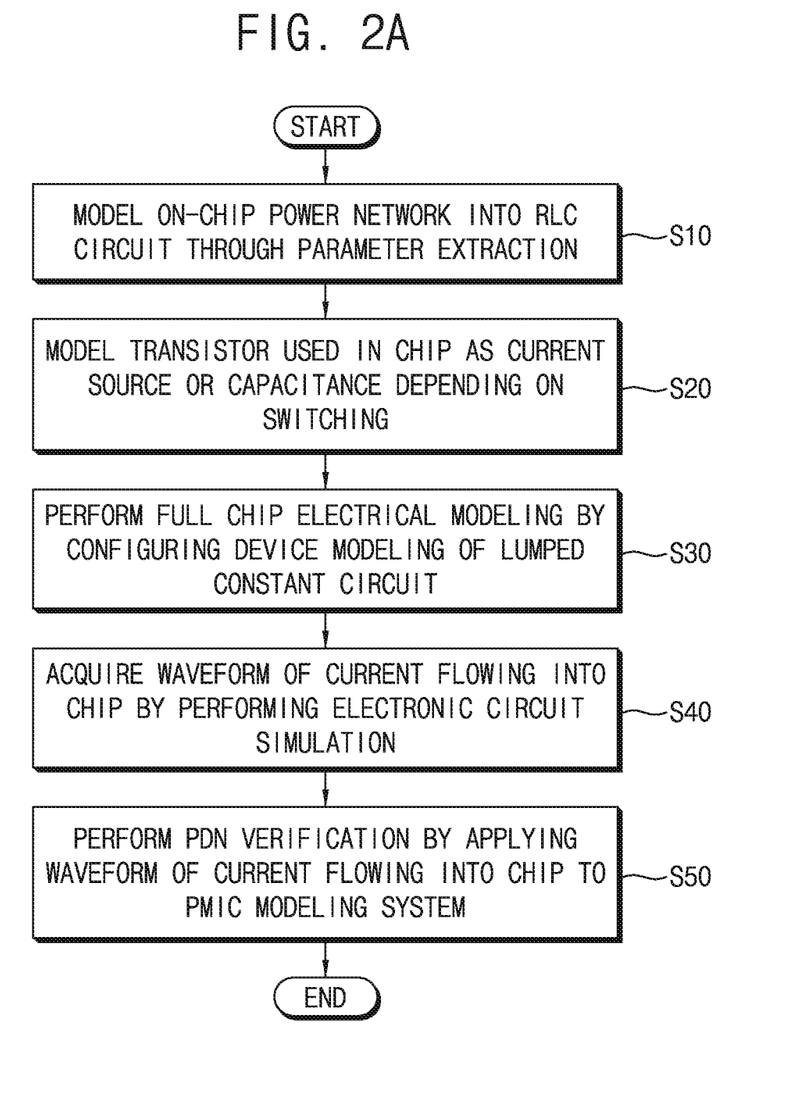
FIG. 2A is a flowchart illustrating a method of generating a current waveform for PDN verification and applying the current waveform to the PMIC modeling system.
Figure 2B:
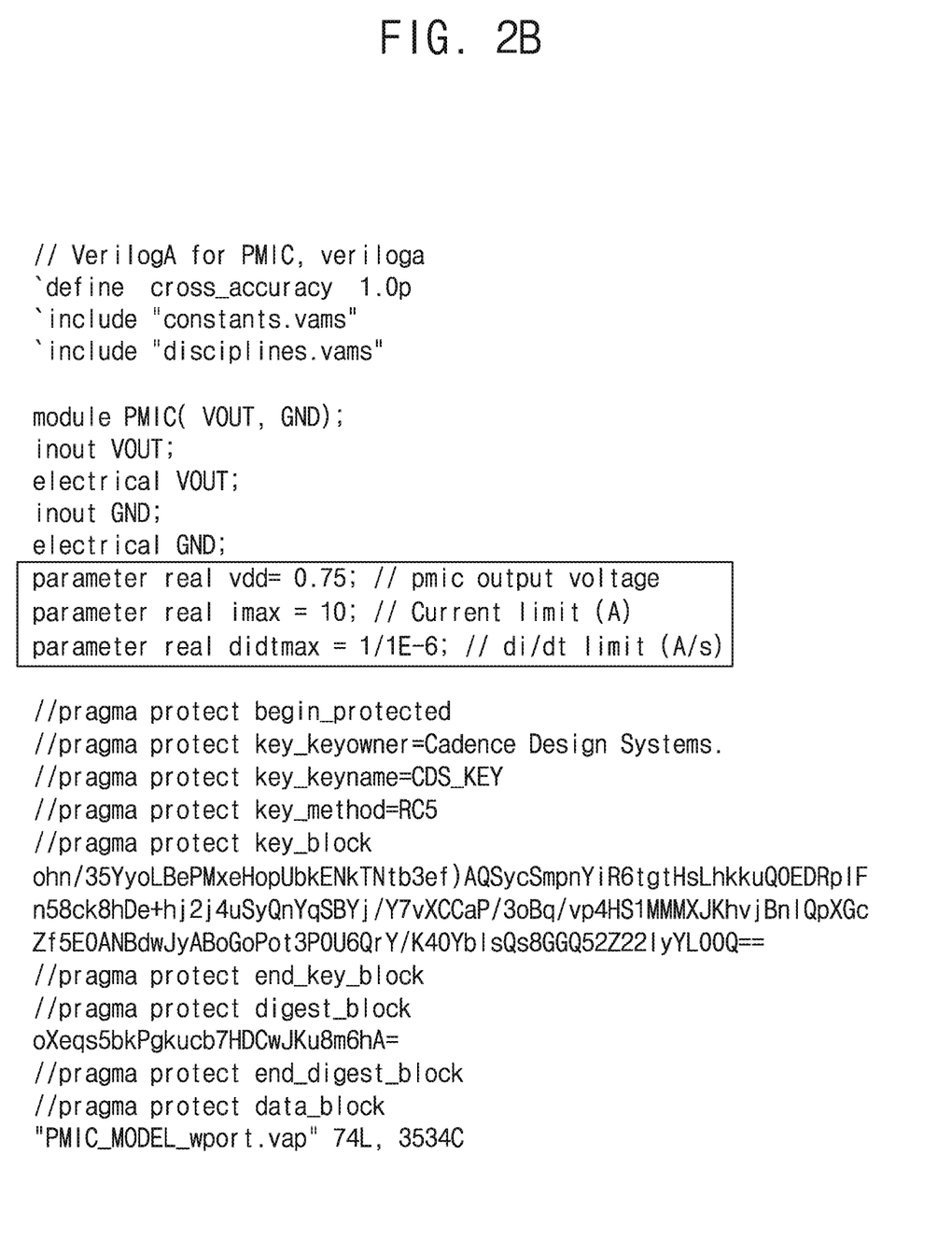
FIG. 2B is a view illustrating an example of parameters input to the PMIC modeling system.

FIG. 2A is a flowchart illustrating a method of generating a current waveform for PDN verification and applying the current waveform to the PMIC modeling system. FIG. 2B is a view illustrating an example of parameters input to the PMIC modeling system.

Referring to FIGS. 1, 2A, and 2B, a waveform of a current required by the load 210 (e.g., a chip) may be generated to perform PDN verification using the PMIC modeling system 100.

As an example, an on-chip power network of the chip may be modeled into an RLC circuit through parameter extraction (S10).

Subsequently, a transistor used in the chip may be modeled as a current source or a capacitance depending on switching (S20).

Subsequently, device modeling of a lumped constant circuit may be configured using the RLC circuit modeling of operation S10 and modeling of a current source or capacitance of operation S20. The lumped constant circuit refers to an equivalent circuit configured on the assumption that inductances, capacitances, and resistances that are distributed through a circuit are concentrated in one position. When the length of the circuit is short as compared to the wavelength of a signal flowing through the circuit, it can be seen that a flow of the signal is instantaneously transmitted from the input terminal to the output terminal of the circuit. In this case, an equivalent circuit having all circuit constants including resistances, inductances, and capacitance concentrated in one position may be configured. Thereafter, full chip electrical modeling may be performed by configuring device modeling of the lumped constant circuit (S30). When there are multiple chips to be used for the PDN analysis, the full chip electrical modeling may be performed for each of the individual chips.

Subsequently, a waveform (hereinafter, referred to as a "current waveform") representing a change in current flowing into the chip (that is, a current required by the chip) with time may be acquired or generated by simulating the full chip electrical modeling using an electronic circuit simulation program (e.g., SPICE) (S40). The current waveform may be configured as program type data, and the controller 130 may load and store the data of the current waveform.

Subsequently, PDN verification may be performed by applying the current waveform of each chip to the PMIC modeling system 100 (S50). As shown in FIG. 2B, parameters of the PMIC may be set in the controller 130.

As an example of the parameters of the PMIC modeling system 100, the value of "vdd" (a first parameter) may be used to set a vdd or positive supply voltage level of the power supply 110. The value of "imax" (a second parameter) may be used to constrain the maximum current. The value of "didtmax" (a third parameter) may be used to constrain the value of di/dt.

Figure 4:
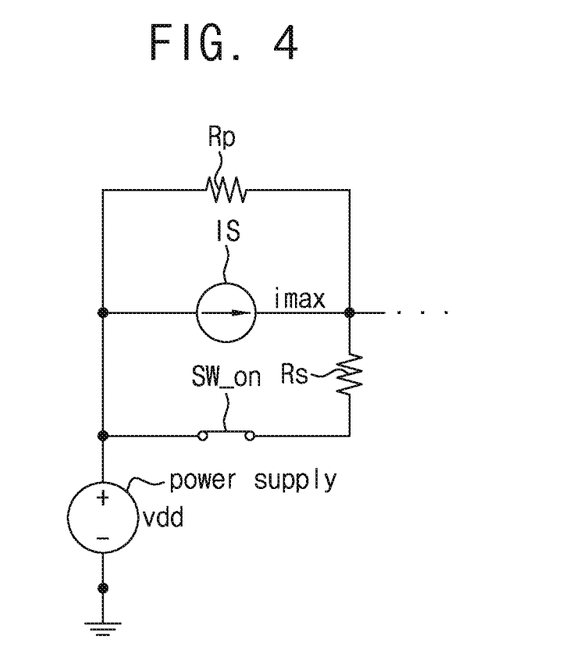
FIG. 4 is a diagram illustrating a switch-on operation when forward bias is applied to an ideal diode ID shown in FIG. 1.

FIG. 3A is a diagram illustrating a method of driving a PMIC modeling system in a normal mode, according to embodiments of the inventive concept. FIG. 4 is a diagram illustrating a switch-on (SW_on) operation when forward bias is applied to the ideal diode ID shown in FIG. 1.

Referring to FIGS. 3A and 4, in the normal mode, the PMIC modeling system 100 may adjust the source current i_source within the maximum current imax. In the normal mode, the ideal diode ID of the power supply 110 may operate in the forward bias.

As an example, the controller 130 may set the ideal diode ID to operate in the forward bias in the normal mode.

As an example, the ideal diode ID may be replaced by a switch. The controller 130 may turn on a switch SW of the power supply 110 in the normal mode.

In the normal mode, the output voltage level is maintained at vdd. Here, vdd may be supplied from the power supply. In the normal mode, the controller 130 may control the power supply 110 and the resistance setting unit 120 such that the current required by the load 210 is supplied.

In the normal mode, the current supply IS may supply the current required by the load 210.

While the PMIC modeling system 100 is operating in the normal mode, the current required by the load 210 may increase. When the source current i_source of the current supply IS required by the load 210 exceeds the maximum current imax, the controller 130 may control the power supply 110 and the resistance setting unit 120 to switch from the normal mode to the maximum current mode.

The PMIC modeling system 100 of the inventive concept may operate the power supply 110 similarly to an ideal voltage source such that the current change value di/dt according to a change of the current required by the load 210 with time does not exceed the maximum di/dt.

The variable resistance of the resistance setting unit 120 may be disposed between an output voltage Vout and a ground GND. A first terminal of the variable resistance may be electrically connected to a terminal of the output voltage Vout. A second terminal of the variable resistance may be electrically connected to a terminal of the ground GND. Here, the connection between the first terminal of the variable resistance and the terminal of the output voltage Vout may be logically performed by an electric circuit program.

In the normal mode, the controller 130 may control the resistance setting unit 120 to set the variable resistance to the maximum value (e.g., infinity). In the normal mode, the resistance setting unit 120 may set the variable resistance r_limit to the maximum value (e.g., infinity) under control of the controller 130.

The resistance setting unit 120 may monitor a current being supplied to the load 210, that is, the load current, and supply a result of monitoring of the current to the controller 130. When supply of the current is to be constrained as a result of monitoring the load current by the resistance setting unit 120, the controller 130 may control the resistance setting unit 120 to switch from the normal mode to the maximum current mode (imax mode).

The resistance setting unit 120 may change the variable resistance r_limit from the maximum value to a preset resistance r_limit' under control of the controller 130 to switch from the normal mode to the maximum current mode (imax mode).

As an example, in switching from the normal mode to the maximum current mode (imax mode), the resistance setting unit 120 may change the variable resistance, namely, the limiting resistance r_limit, such that the source current i_source (i_out+i_limit) at the current time changes to the maximum current imax and thus the maximum current mode (imax mode) is set.

TABLE 1

| di/dt @ VOUT | Parameter | Equation |
|---|---|---|
| — | i_out | Load current |
| — | i_source | i_limit + i_out |
| di/dt > max(di/dt) | i_source' | Maximum current (imax) |
|  | i_limit' | i_source' − i_out' = imax − (i_out + max(di/dt)*ΔT |
|  | i_out' | — |
| di/dt < max(di/dt) | i_limit' | Maintaining previous value (i_limit) |

As shown in Table 1, the controller 130 may calculate the value of a target limiting current to be used to calculate the values of a target current i_source and the limiting resistance r_limit. The target limiting current value calculated by the controller 130 may be supplied to the resistance setting unit 120. When the limiting resistance r_limit is changed by the resistance setting unit 120 under control of the controller 130, the first source current i_source of the power supply 110 may be changed to the second source current i_source'.

Figure 3B:
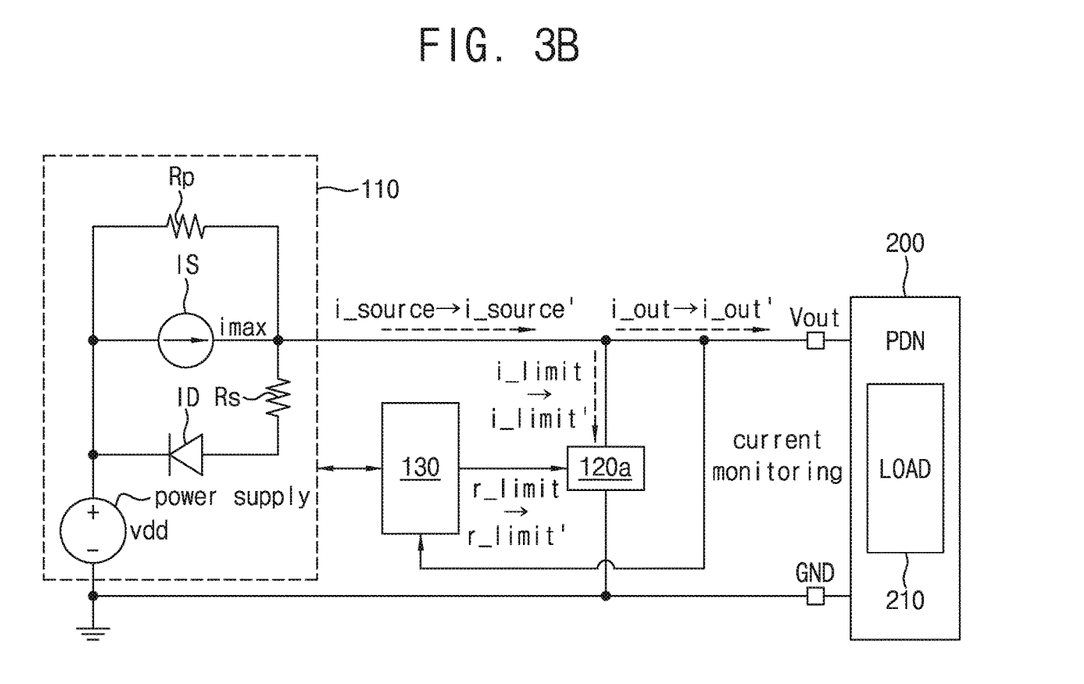
FIG. 3B is a diagram illustrating a method of driving a PMIC modeling system in a normal mode, according to embodiments of the inventive concept.

FIG. 3B is a diagram illustrating a method of driving a PMIC modeling system in a normal mode, according to embodiments of the inventive concept.

It is illustrated in FIG. 3A that the resistance setting unit 120 includes a variable resistance and the mode change is performed by changing the resistance value of the variable resistance. The embodiments are not limited thereto. As shown in FIG. 3B, a resistance setting unit 120a may include an electronic device capable of adjusting a resistance other than the variable resistance.

Figure 5:
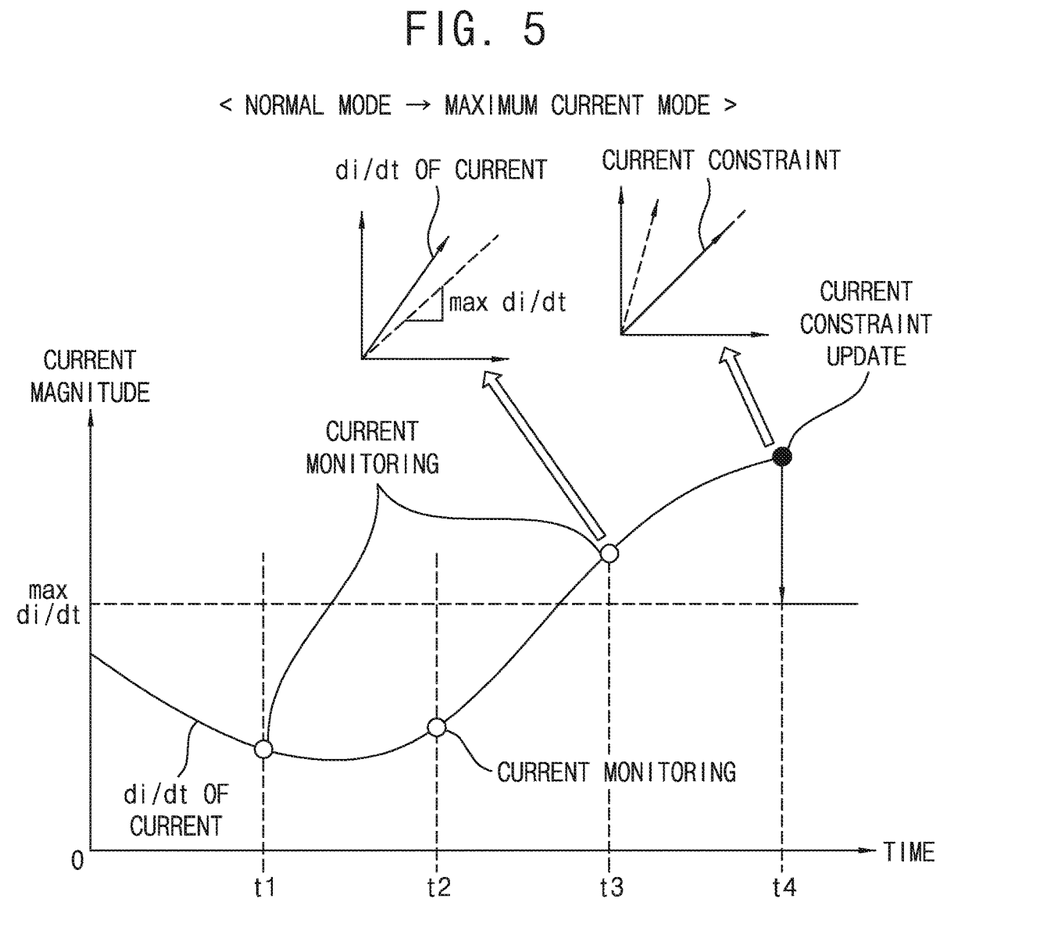
FIG. 5 is a diagram illustrating operation switching from a normal mode to a maximum current mode (imax mode) when supply of a current is to be constrained, according to embodiments.

FIG. 5 is a diagram illustrating operation switching from a normal mode to a maximum current mode (imax mode) when supply of a current is to be constrained, according to embodiments.

Referring to FIG. 5, the resistance setting unit 120 may monitor the load current at each preset time t1, t2, t3, t4, etc. The resistance setting unit 120 may compare a load current value monitored at the current time with a load current value at the previous time.

The resistance setting unit 120 may generate a result of comparison between the load current value at the current time and the load current value at the previous time. The resistance setting unit 120 may supply the comparison result of the load current values to the controller 130 in real time. The embodiments are not limited thereto. The controller 130 may determine whether a mode change is performed based on the comparison result of the current values generated at each preset time t1, t2, t3, t4, etc. When it is determined that the mode change is performed, the controller 130 may control the resistance setting unit 120 to change the mode.

When the current di/dt required by the load 210 does not exceed the maximum current max di/dt, the resistance setting unit 120 may maintain the variable resistance at a first value r_limit (e.g., infinity). The PMIC modeling system 100 operates in the normal mode while the variable resistance maintains the first value (e.g., infinity).

When the current di/dt required by the load 210 exceeds the maximum current max di/dt, the resistance setting unit 120 changes the variable resistance from the first value r_limit to a second value r_limit'. The second value r_limit' of the variable resistance may be set to be less than the first value r_limit. The second value r_limit' of the variable resistance is not fixed to one value, but may be changed in real time according to the target source current i_source.

As an example, in switching from the normal mode to the maximum current mode (imax mode), the resistance setting unit 120 may change the variable resistance from the first value r_limit to the second value r_limit' such that the source current i_source (i_out+i_limit) at the current time becomes the maximum current imax and thus the maximum current mode (imax mode) is set.

The current supply IS may output, to the load 210, a second source current i_source' changed from the first source current i_source according to the changed variable resistance r_limit'. The source current output from the current supply IS may be changed in real time according to the current required by the load 210.

Figure 6A:
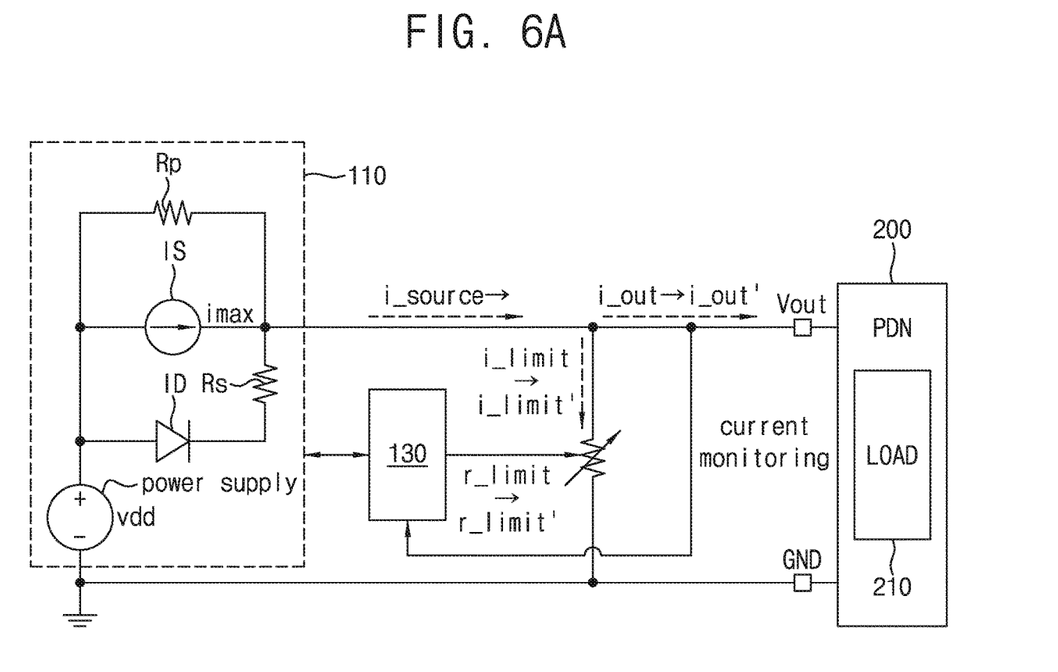
FIG. 6A is a diagram illustrating a method of driving a PMIC modeling system in a maximum current mode (imax mode), according to embodiments of the inventive concept.
Figure 7:
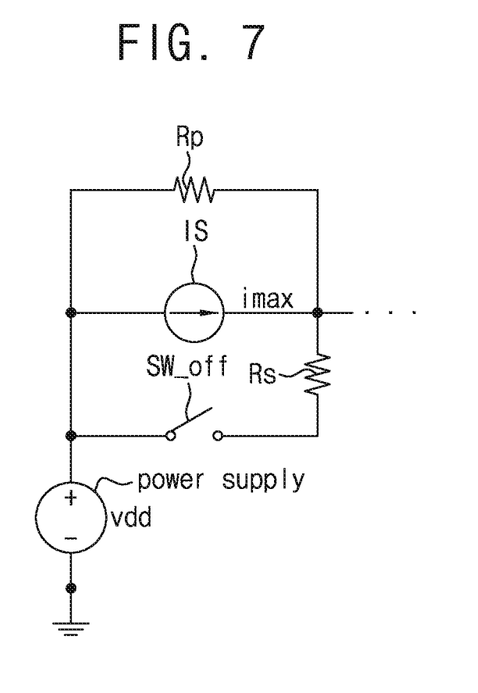
FIG. 7 is a diagram illustrating a switch-off operation when reverse bias is applied to the ideal diode ID shown in FIG. 1.

FIG. 6A is a diagram illustrating a method of driving a PMIC modeling system in a maximum current mode (imax mode), according to embodiments of the inventive concept. FIG. 7 is a diagram illustrating a switch-off (SW_off) operation when reverse bias is applied to the ideal diode ID shown in FIG. 1.

Referring to FIGS. 6A and 7, in the maximum current mode, the PMIC modeling system 100 may constrain the source current i_source to the maximum current imax.

In the maximum current mode, the ideal diode ID of the power supply 110 may operate in the reverse bias.

As an example, the controller 130 may set the ideal diode ID to operate in the reverse bias in the maximum current mode.

As an example, the ideal diode ID may be replaced by a switch. The controller 130 may turn off the switch SW of the power supply 110 in the maximum current mode.

In the maximum current mode (imax mode), the resistance setting unit 120 may monitor a current being supplied to the load 210, that is, the load current, and supply the result of current monitoring to the controller 130. When the constraint on the supply of current is not necessary as the result of monitoring of the load current by the resistance setting unit 120, the controller 130 may control the resistance setting unit 120 to switch from the maximum current mode to the normal mode.

Referring to FIG. 5, the resistance setting unit 120 may monitor the load current at each preset time t1, t2, t3, t4, etc.

The resistance setting unit 120 may compare a load current value monitored at the current time with a load current value at the previous time.

The resistance setting unit 120 may generate a result of comparison between the load current value at the current time and the load current value at the previous time. The resistance setting unit 120 may provide the comparison result of the load current values to the controller 130 in real time. The embodiments are not limited thereto. The controller 130 may determine whether a mode change is performed based on the comparison result of the current values generated at each preset time t1, t2, t3, t4, etc. When it is determined that the mode change is performed, the controller 130 may control the resistance setting unit 120 to change the mode. The output current of the PMIC modeling system 100 may be adjusted by changing the resistance value of the variable resistance of the resistance setting unit 120.

In the maximum current mode (imax mode), the current driving capability of the current supply IS is maximized. In the maximum current mode (imax mode), the current supply IS may output a constant maximum current, thereby operating similarly to a DC current source.

The resistance setting unit 120 may change the limiting resistance value r_limit of the variable resistance in real time based on the control of the controller 130. The resistance setting unit 120 may control the output current i_out supplied to the load 210 by changing the limiting resistance value r_limit of the variable resistance in real time.

TABLE 2

| di/dt @ VOUT | Parameter | Equation |
|---|---|---|
| — | i_source | Maximum current (constant) |
| — | i_out | i_source − i_limit |
| di/dt > 0 | i_out' | i_out + max(di/dt)*ΔT |
|  | i_limit' | i_source − i_out' = imax − (i_out + max(di/dt)*ΔT) |
| di/dt < 0 | i_limit' | Maintaining previous value (i_limit) |

As shown in Table 2, the controller 130 may calculate the limiting current i_limit for estimating an allowable maximum current and the limiting resistance value r_limit.

The variable resistance of the resistance setting unit 120 may be adjusted according to the limiting current i_limit calculated by the controller 130. The output current in the PMIC modeling system 100 may be changed by adjusting the variable resistance of the resistance setting unit 120.

In the maximum current mode (imax mode), a current that is insufficient due to the current supply constraint may be supplemented by supplying a discharging current of the decoupling capacitor in the load 210.

In the maximum current mode (imax mode), the output voltage level may be lower than or equal to vdd supplied by the power supply. In the maximum current mode (imax mode), the ideal diode ID may maintain the reverse bias state.

Figure 6B:
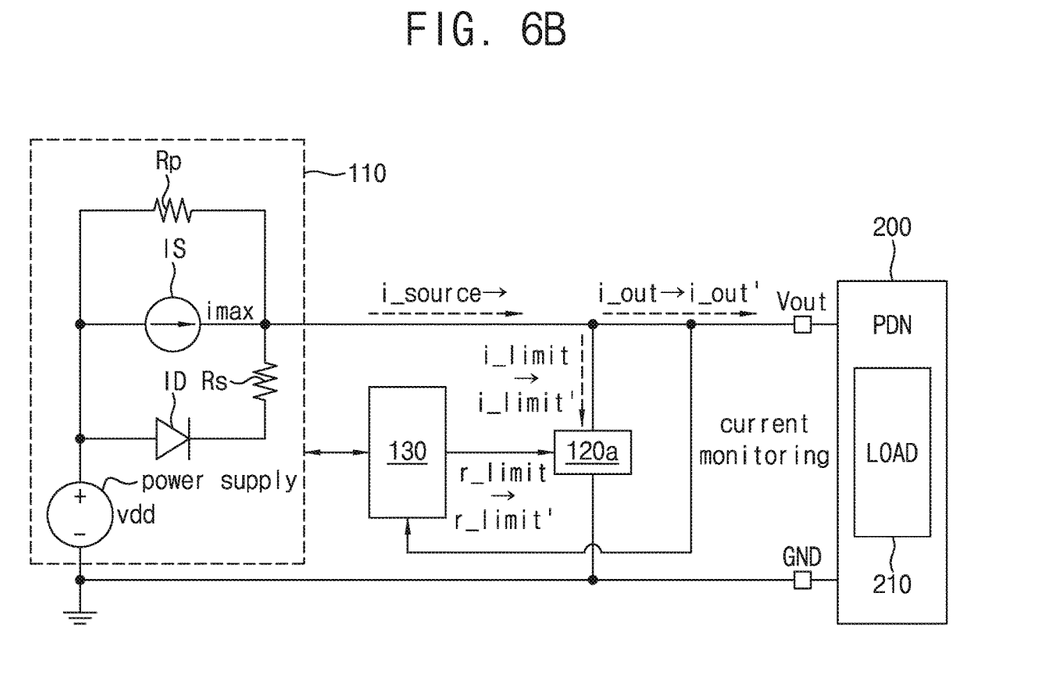
FIG. 6B is a diagram illustrating a method of driving a PMIC modeling system in a maximum current mode (imax mode), according to embodiments of the inventive concept.

FIG. 6B is a diagram illustrating a method of driving a PMIC modeling system in a maximum current mode (imax mode), according to embodiments of the inventive concept.

It is illustrated in FIG. 6A that the resistance setting unit 120 includes a variable resistance and the mode change is performed by changing the resistance value of the variable resistance. The embodiments are not limited thereto. As shown in FIG. 6B, the resistance setting unit 120a may include an electronic device capable of adjusting a resistance other than the variable resistance.

Figure 8:
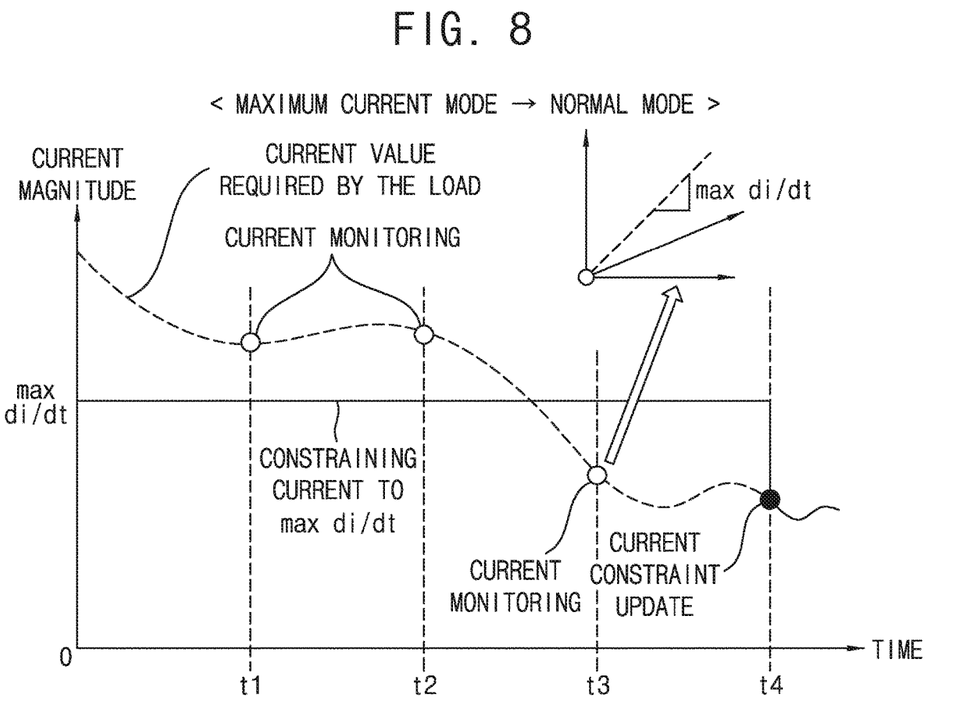
FIG. 8 is a view for describing operation switching from a maximum current mode (imax mode) to a normal mode, according to embodiments.

FIG. 8 is a view for describing operation switching from a maximum current mode (imax mode) to a normal mode, according to embodiments.

Referring to FIG. 8, a current required by the load 210 may be changed during the maximum current mode (imax mode). When the current required by the load 210 is decreased to be lower than or equal to the maximum current value during the maximum current mode (imax mode), constraints on the current supply are not necessary any longer. The operation of the PMIC modeling system 100 may be switched from the maximum current mode (imax mode) to the normal mode when there is no need to constrain the current supply. In this case, when the decoupling capacitor of the load 210 is fully charged, the output voltage level may be restored to vdd and the operation may be switched from the maximum current mode (imax mode) to the normal mode.

When the operation of the PMIC modeling system 100 is switched to the normal mode, the controller 130 may change the ideal diode ID back to the forward bias state.

In addition, the controller 130 may control the resistance setting unit 120 to change the variable resistance from a value to infinity (r_limit→r_limit').

The resistance setting unit 120 may change the variable resistance from a value to infinity (r_limit→r_limit') according to the control of the controller 130. By changing the variable resistance, the operation of the PMIC modeling system 100 may be switched from the maximum current mode to the normal mode. Because the operation is switched from the maximum current mode (imax mode) to the normal mode, the current supply IS may output the current required by the load 210 without constraining the current.

The PMIC modeling system 100 may be implemented with a simplified circuit model. As an example, the PMIC modeling system 100 may be implemented using the verilog-a language (see FIG. 2B). The PMIC modeling system 100 may be implemented in the verilog-a language and be used universally for simulation and analysis that use a SPICE-based circuit simulator.

FIG. 9 is a diagram illustrating an example of verification of operation performance of a PMIC in which a PMIC modeling system according to embodiments of the inventive concept is applied to a chip package system unit.

Referring to FIG. 9, the PMIC modeling system 100 of the inventive concept may be applied to a co-analysis of a chip-package-system. The PMIC modeling system 100 may be applied to power integrity verification at the system level.

The PMIC modeling system 100 may be applied to system level PDN optimization and simulation of PDN noise and PDN jitter. The PMIC modeling system 100 may be applied to various simulations and analyses that use a current supply limiting capability (maximum di/dt), including a voltage regulator module (VRM) such as a PMIC.

Figure 10:
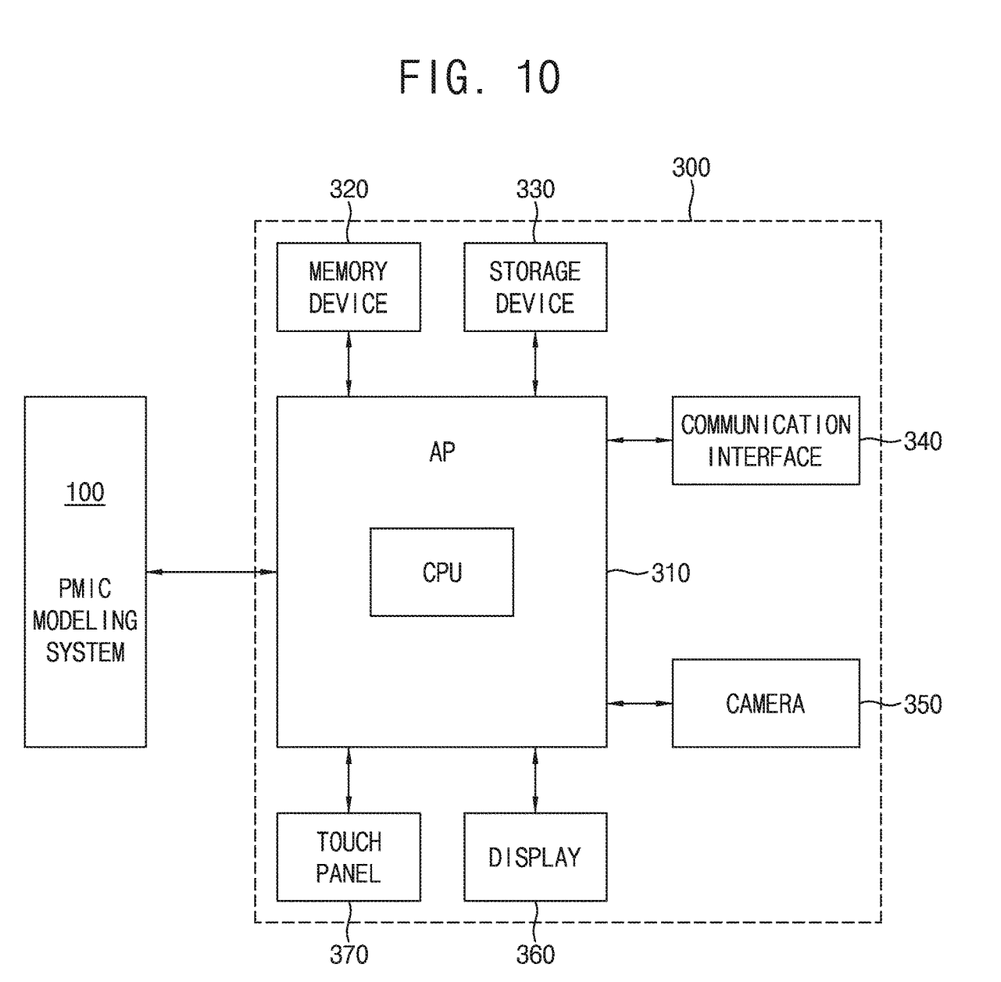
FIG. 10 is a diagram illustrating an example of verification of operation performance of a PMIC in which a PMIC modeling system according to embodiments of the inventive concept is applied to a mobile device.

FIG. 10 is a diagram illustrating an example of verification of operation performance of a PMIC in which a PMIC modeling system according to embodiments of the inventive concept is applied to a mobile device.

Referring to FIG. 10, a mobile device 300 may include an application processor (AP) 310, a memory device 320, a storage device 330, a communication interface 340, a camera 350, a display 360, and a touch panel 370. The mobile device 300 may be implemented as a smartphone.

The AP 310 may control the overall operation of the mobile device 300. The AP 310 may control the memory device 320, the storage device 330, the communication interface 340, the camera 350, the display 360 and the touch panel 370. The AP 310 may include a CPU core.

The memory device 320 and the storage device 330 may store data for the operation of the mobile device 300. For example, the memory device 320 may correspond to a volatile memory device such as a DRAM, a static random access memory (SRAM), or a mobile DRAM. The storage device 330 may correspond to a non-volatile memory device such as an erasable programmable read-only memory (EPROM), an electrically erasable programmable read-only memory (EEPROM), a flash memory, a PRAM, a resistance random access memory (RRAM), a nano floating gate memory (NFGM), a polymer random access memory (PoRAM), an MRAM, or an FRAM. In an embodiment, the storage device 330 may further include an SSD, a hard disk drive (HDD), and a compact disc read-only memory (CD-ROM).

The communication interface 340 may include a code division multiple access (CDMA) module, a long term evolution (LTE) module, a radio frequency (RF) module, an ultra-wideband (UWB) module, a wireless local area network (WLAN) module, and a worldwide interoperability for microwave access (WiMAX) module. The mobile device 300 may further include a global positioning system (GPS) module, a microphone module, a speaker module, and a gyroscope module.

The PMIC modeling system 100 can manage power for operations of the AP 310, the memory device 320, the storage device 330, the communication interface 340, the camera 350, the display 360 and the touch panel 370 of the mobile device 300. In response to a command CMD input from the AP 310, the PMIC modeling system 100 may supply a level of a first driving voltage in the normal mode and a second driving voltage in the maximum current mode.

The PMIC modeling system and the method of driving the same according to the inventive concept can limit the current supply capability of the PMIC by controlling a current change with time di/dt.

The PMIC modeling system and the method of driving the same according to the inventive concept can adjust a current change with time di/dt by switching from the normal mode to the maximum current mode (imax mode) or from the maximum current mode (imax mode) to the normal mode according to a result of monitoring the output current of the current supply in real time.

The PMIC modeling system and the method of driving the same according to the inventive concept may reflect a characteristic similar to an actual PMIC in the PDN simulation by reflecting the limited current supply capability.

The PMIC modeling system and the method of driving the same according to the inventive concept can reflect the influence of a voltage drop and a decoupling capacitor such that performance verification that is the same as or similar to an actual measurement result of the PMIC can be performed.

According to the embodiments of the inventive concept, simulation of the PMIC can be performed in accordance with various loads, and the time used for simulation of the PMIC can be reduced.

According to the embodiments of the inventive concept, a power management integrated circuit (PMIC) modeling system for limiting the capability of current supply by controlling a current change with time di/dt and a method of driving the same can be provided.

According to the embodiments of the inventive concept, the PMIC modeling system can adjust the current change with time di/dt by switching from a normal mode to a maximum current mode (imax mode) or from the maximum current mode (imax mode) to the normal mode according to a result of monitoring of the output current of a current supply in real time.

According to the embodiments of the inventive concept, the PMIC modeling system can reflect characteristics similar to those of an actual PMIC in PDN simulation by reflecting the limited current supply capability. The PMIC modeling system can implement performance verification that is the same as or similar to the actual measurement result in the PDN analysis by reflecting the influence of the voltage drop and the decoupling capacitor.

According to the embodiments of the inventive concept, simulation of a PDN can be performed according to various loads and the time used for simulation of the PDN can be reduced.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the embodiments of the inventive concept have been described with reference to the accompanying drawings, it may be understood by those skilled in the art that various modifications may be made without departing from the scope of the inventive concept and without changing features thereof. Therefore, the above-described embodiments may be considered in a descriptive sense only and not for purposes of limitation.

What is claimed is:

1. A power management integrated circuit (PMIC) modeling system for a power distribution network (PDN) analysis, the PMIC modeling system comprising:
    a power supply configured to supply a source current for driving a load;
    a resistance setting unit configured to monitor a load current being supplied to the load, and generate a current comparison value by comparing a first current value of the load current at a current time with a second current value of the load current at a previous time; and
    a controller configured to, based on the current comparison value:
        generate a control signal for changing a variable resistance of the resistance setting unit; and
        control the power supply to change the source current,
    wherein the resistance setting unit is further configured to, based on the control signal, change a resistance value of the variable resistance, and
    wherein the load current is changed based on the source current and the resistance value that are changed.

2. The PMIC modeling system of claim 1, wherein the controller is further configured to, based on the current comparison value, control the power supply and the resistance setting unit to switch between a maximum current mode for supplying a constant current and a normal mode for supplying the source current for driving the load.

3. The PMIC modeling system of claim 2, wherein the power supply comprises:
    an ideal diode;
    a current supply connected to the ideal diode in parallel;
    a first resistor connected to the current supply in parallel; and
    a second resistor connected to the ideal diode in series.

4. The PMIC modeling system of claim 3, wherein the controller is further configured to, based on the current comparison value being greater than a maximum comparison value in the normal mode, control the power supply to switch from the normal mode to the maximum current mode by controlling the ideal diode to maintain a reverse bias state.

5. The PMIC modeling system of claim 3, wherein the controller is further configured to, based on the current comparison value being less than a maximum comparison value in the maximum current mode, control the power supply to switch from the maximum current mode to the normal mode by controlling the ideal diode to maintain a forward bias state.

6. The PMIC modeling system of claim 2, wherein the resistance setting unit is further configured to transmit the current comparison value to the controller.

7. The PMIC modeling system of claim 2, wherein the controller is further configured to, based on the current comparison value being greater than a maximum comparison value in the normal mode, control the resistance setting unit to switch from the normal mode to the maximum current mode.

8. The PMIC modeling system of claim 7, wherein the controller is further configured to control the resistance setting unit to switch from the normal mode to the maximum current mode by changing the resistance value of the variable resistance from a first value to a second value less than the first value.

9. The PMIC modeling system of claim 2, wherein the controller is further configured to, based on the current comparison value being less than a maximum comparison value in the maximum current mode, control the resistance setting unit to switch from the maximum current mode to the normal mode.

10. The PMIC modeling system of claim 9, wherein the controller is further configured to control the resistance setting unit to switch from the maximum current mode to the normal mode by changing the resistance value of the variable resistance to infinity.

11. The PMIC modeling system of claim 2, wherein the controller is further configured to, based on the load current that is used by the load being decreased to be lower than or equal to a maximum current and a decoupling capacitor of the load being fully charged during the maximum current mode, control the power supply and the resistance setting unit to switch from the maximum current mode to the normal mode.

12. A power management integrated circuit (PMIC) modeling system for a power distribution network (PDN) analysis, the PMIC modeling system comprising:
    a power supply configured to supply a source current for driving a load;
    a resistance setting unit configured to monitor a load current being supplied to the load, and generate a current comparison value by comparing a first current value of the load current at a current time with a second current value of the load current at a previous time; and
    a controller configured to, based on the current comparison value:
        set parameters for controlling the source current of the power supply; and
        generate a control signal for changing a variable resistance of the resistance setting unit, based on the parameters,
    wherein the resistance setting unit is further configured to, based on the control signal, change a resistance value of the variable resistance, and
    wherein the load current is changed based on the source current and the resistance value that are changed.

13. The PMIC modeling system of claim 12, wherein the parameters that are set comprise:
    a first parameter for setting a positive supply voltage level of the power supply;
    a second parameter for limiting a maximum current of the power supply; and
    a third parameter for limiting the current comparison value.

14. The PMIC modeling system of claim 12, wherein data of a current waveform that is used by the load is stored in the controller, and
    wherein the controller is further configured to perform the PDN analysis, using the data of the current waveform.

15. A method of operating a power management integrated circuit (PMIC) modeling system for a power distribution network (PDN) analysis, the method comprising:
    controlling a power supply to supply a source current for driving a load;
    monitoring a load current being supplied to the load;
    generating a current comparison value by comparing a first current value of the load current at a current time with a second current value of the load current at a previous time;

based on the current comparison value:
  changing a resistance value of a variable resistance; and
  controlling the power supply to change the source current,
wherein the load current is changed based on the source current and the resistance value that are changed.

16. The method of claim 15, wherein the changing the resistance value of the variable resistance comprises, based on the current comparison value being greater than a maximum comparison value in a normal mode for supplying the source current for driving the load, controlling the variable resistance to switch from the normal mode to a maximum current mode for supplying a constant current.

17. The method of claim 16, wherein the controlling the variable resistance to switch from the normal mode to the maximum current mode comprises changing the resistance value of the variable resistance from a first value to a second value less than the first value.

18. The method of claim 16, wherein the controlling the variable resistance to switch from the normal mode to the maximum current mode comprises changing the resistance value of the variable resistance value such that the source current becomes a maximum current.

19. The method of claim 16, wherein, in the maximum current mode, an output voltage level of the power supply is maintained to be lower than or equal to a power supply voltage value of the power supply.

20. The method of claim 15, wherein the changing the resistance value of the variable resistance comprises, based on the load current that is used by the load being decreased to be lower than or equal to a maximum current and a decoupling capacitor of the load being fully charged during a maximum current mode for supplying a constant current, controlling the variable resistance to switch from the maximum current mode to a normal mode for supplying the source current for driving the load.

* * * * *